United States Patent
Draht et al.

(10) Patent No.: US 10,207,458 B2
(45) Date of Patent: Feb. 19, 2019

(54) SETTING WELDING DEVICE, MODULAR COMPONENTS THEREOF AND A CONTINUOUS CONNECTING METHOD THAT CAN BE CARRIED OUT WITH SUCH A DEVICE

(71) Applicant: BOELLHOFF VERBINDUNGSTECHNIK GMBH, Bielefeld (DE)

(72) Inventors: Torsten Draht, Schloss Holte-Stukenbrock (DE); Sergej Hartwig-Biglau, Löhne (DE); Holger Thommes, Strohn (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 530 days.

(21) Appl. No.: 14/786,194

(22) PCT Filed: Sep. 23, 2013

(86) PCT No.: PCT/EP2013/069754
§ 371 (c)(1),
(2) Date: Oct. 22, 2015

(87) PCT Pub. No.: WO2014/173472
PCT Pub. Date: Oct. 30, 2014

(65) Prior Publication Data
US 2016/0067913 A1 Mar. 10, 2016

(30) Foreign Application Priority Data
Apr. 22, 2013 (DE) .................. 10 2013 207 284

(51) Int. Cl.
B32B 37/00 (2006.01)
B29C 65/74 (2006.01)
(Continued)

(52) U.S. Cl.
CPC .............. *B29C 65/74* (2013.01); *B23K 9/202* (2013.01); *B23K 11/0053* (2013.01);
(Continued)

(58) Field of Classification Search
CPC ......... B29C 65/02; B29C 65/06; B29C 65/74; B23K 9/202; B23K 11/0053; B23K 11/115; B23K 28/02
(Continued)

(56) References Cited

U.S. PATENT DOCUMENTS 3,624,340 A 11/1971 Hinden
4,766,283 A 8/1988 McCorvey et al.
(Continued)

FOREIGN PATENT DOCUMENTS

DE 1965832 U 8/1967
DE 10015713 A1 10/2001
(Continued)

OTHER PUBLICATIONS

Written Opinion & International Search Report for PCT/EP2013/069754 dated Mar. 5, 2014, 12 pages.
(Continued)

*Primary Examiner* — James D Sells
(74) *Attorney, Agent, or Firm* — Reising Ethington P.C.

(57) ABSTRACT

A setting welding device is set forth for setting stud-like auxiliary joining parts in a plurality of layers of material and subjecting them to a mechanical-thermoforming process on a second layer of material and connecting them to said second layer by way of a welding operation. For this purpose, the punch is used to apply to the welding auxiliary joining part mechanical and thermal loads that follow prescribed characteristic force and current curves. Furthermore, a corresponding connecting method that can be realized with the aid of the setting welding device is also disclosed.

26 Claims, 5 Drawing Sheets

Figure 1A:
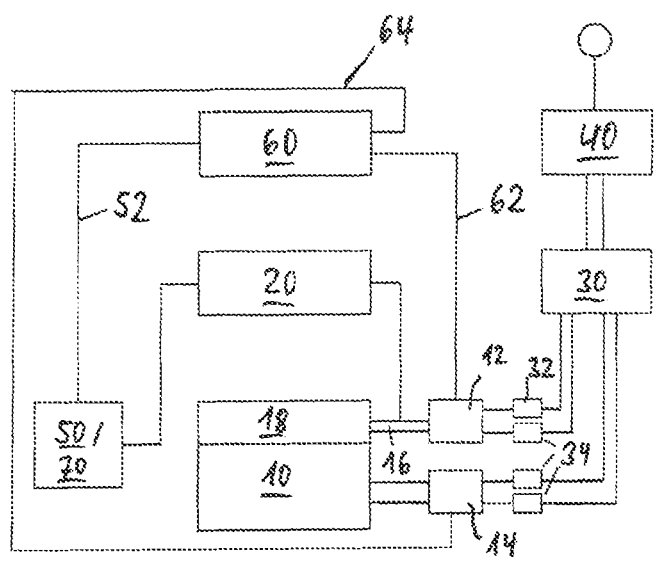

(51) Int. Cl.
  *B23K 11/00* (2006.01)
  *B23K 28/02* (2014.01)
  *B23K 9/20* (2006.01)
  *B23K 11/11* (2006.01)
  *B29C 65/02* (2006.01)
  *B23K 11/28* (2006.01)
  *B23K 11/34* (2006.01)

(52) U.S. Cl.
  CPC ............ *B23K 11/115* (2013.01); *B23K 28/02* (2013.01); *B29C 65/02* (2013.01); *B23K 11/28* (2013.01); *B23K 11/34* (2013.01)

(58) Field of Classification Search
  USPC ........................................................ 156/73.5
  See application file for complete search history.

(56) References Cited

U.S. PATENT DOCUMENTS

| | | | |
|---|---|---|---|
| 5,739,498 | A | 4/1998 | Sunamoto et al. |
| 5,773,783 | A | 6/1998 | Bowerman et al. |
| 7,937,816 | B2 | 5/2011 | Droulez et al. |
| 8,461,484 | B2 | 6/2013 | Tetzlaff et al. |
| 8,595,914 | B2 | 12/2013 | Koppitz et al. |
| 2010/0084380 | A1* | 4/2010 | Tetzlaff ............. B23K 11/0053 219/117.1 |
| 2015/0258624 | A1 | 9/2015 | Draht et al. |

FOREIGN PATENT DOCUMENTS

| | | |
|---|---|---|
| DE | 10060390 A1 | 6/2002 |
| DE | 10251414 A1 | 5/2004 |
| DE | 10352727 B3 | 4/2005 |
| DE | 102005006253 A1 | 8/2006 |
| DE | 102005056808 A1 | 5/2007 |
| DE | 102007036416 A1 | 2/2009 |
| DE | 102004025492 A1 | 8/2009 |
| DE | 102008044451 A1 | 2/2010 |
| DE | 102009006056 A1 | 7/2010 |
| DE | 102010020569 A1 | 11/2011 |
| DE | 102010031709 A1 | 1/2012 |
| DE | 102011114306 A1 | 3/2013 |
| DE | 102012018866 A1 | 3/2014 |
| EP | 0947279 A2 | 10/1999 |
| EP | 1679147 A2 | 7/2006 |
| EP | 1767792 A2 | 3/2007 |

OTHER PUBLICATIONS

CN Office Action for CN Application No. 201380075839.5 dated Nov. 11, 2016, 8 pages.

English translation of the International Preliminary Report on Patentability for PCT/EP2013/069754 dated Oct. 27, 2015, 10 pages.

* cited by examiner

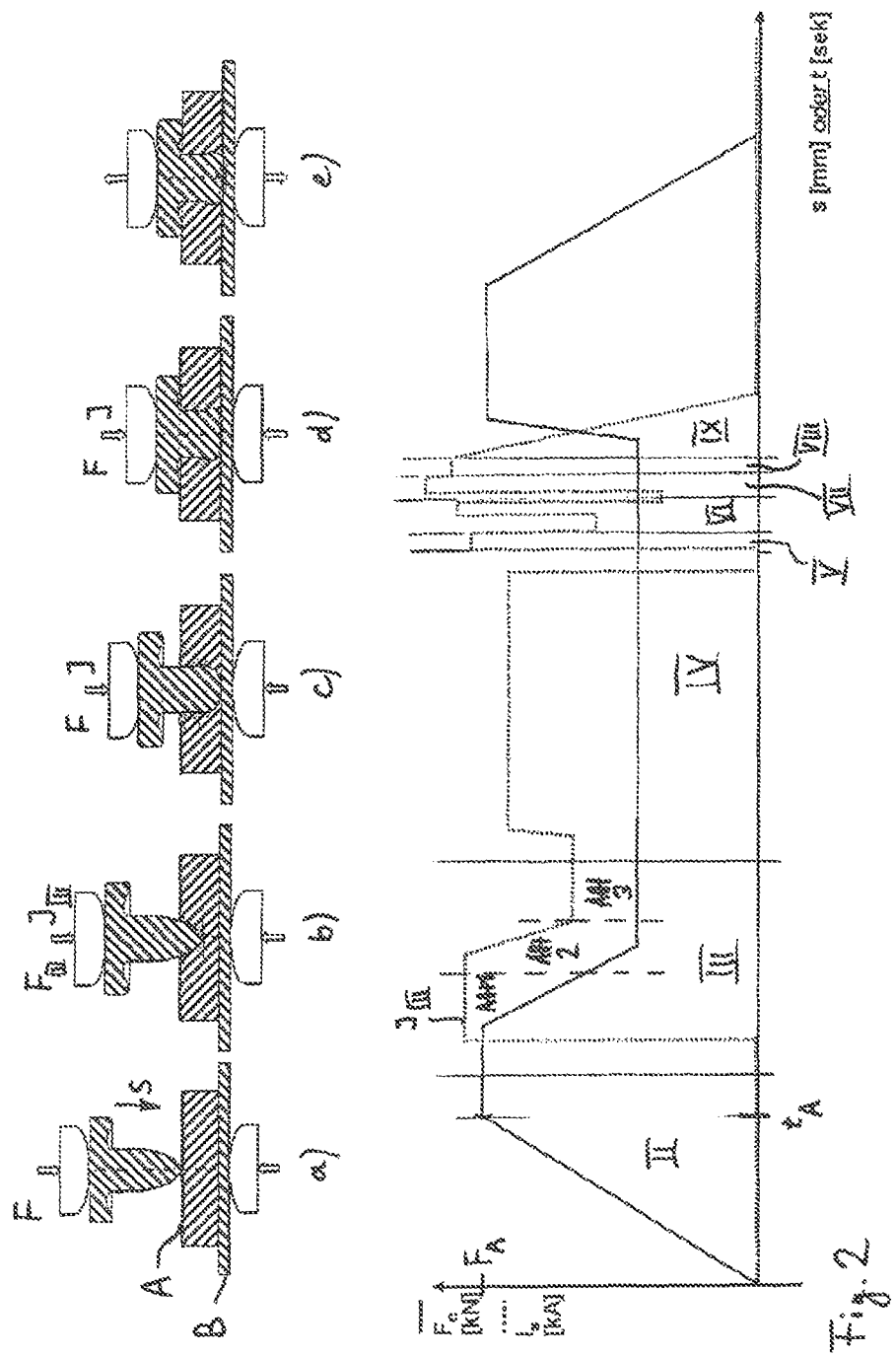

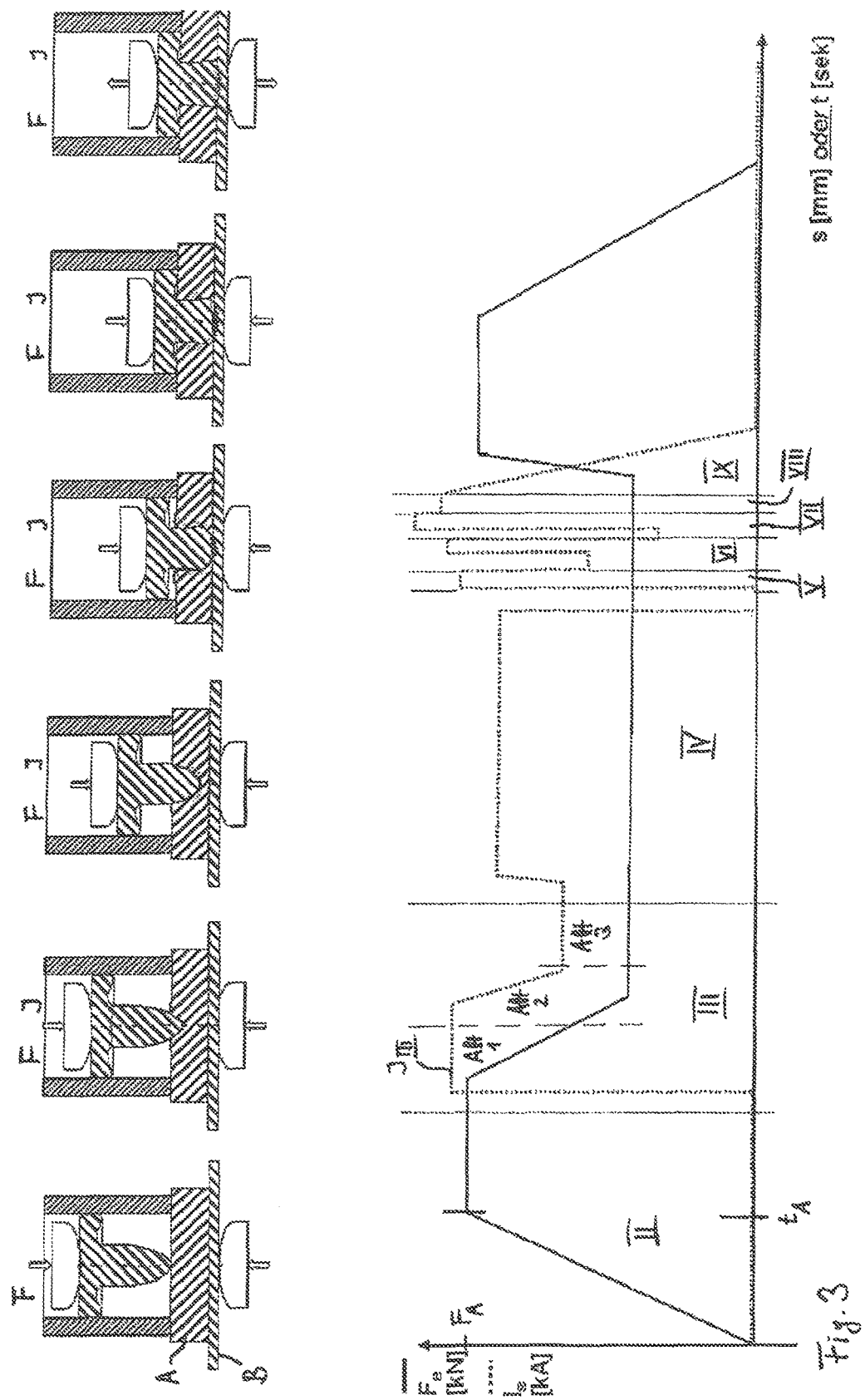

SETTING WELDING DEVICE, MODULAR COMPONENTS THEREOF AND A CONTINUOUS CONNECTING METHOD THAT CAN BE CARRIED OUT WITH SUCH A DEVICE

1. TECHNICAL FIELD

The present disclosure relates to a combined setting welding device, which is designed to set stud-like welding auxiliary joining parts in at least one first layer of material and to subject them to a mechanical thermoforming process on a second electrically conductive layer of material and to connect them in a firmly-bonded manner, i.e. a positive substance connection, through a welding operation. Moreover, the present disclosure relates to a continuous connecting method that can be carried out with this setting welding device in the form of a mechanical-thermal setting welding process with the aid of a stud-like welding auxiliary joining part.

2. BACKGROUND

Welding is a prevalent method for interconnecting components made of weldable material, such as steel. Exemplary welding methods are resistance spot welding and stud welding, in which two opposite-lying components are interconnected in spots by means of welding. A further welding method is arc stud welding.

In different industries, components that are made partially of non- or poorly weldable material may need to be interconnected nowadays. Nonetheless, welding represents an effective connecting method even for these components made of non- or poorly weldable material. For this purpose, a welding auxiliary joining part made of a weldable material is fastened in the component made of non- or poorly weldable material. A weld connection between a component made of a weldable material and the welding auxiliary joining part is produced below so that the component made of weldable material and the component made of non- or poorly weldable material are interconnected via the welding auxiliary joining part. Examples of components made of non- or poorly weldable material are aluminum sheets, molded parts made of plastic or fiber-reinforced plastic, for example carbon fiber-reinforced plastic, to name just a few examples. The method described above results for example from German patent application DE 100 15 713 A1.

German patent application 10 2005 006 253 A1 describes a connecting method by means of welding between a component made of non- or poorly weldable material and a component made of weldable material. Here, a stud with a shaft and a head made of weldable material is inserted into a prefabricated hole in the component made of non- or poorly weldable material and subsequently welded with the component made of weldable material. In order to reliably fasten the stud with its shaft in the pre-punched area of the component made of non- or poorly weldable material, the shaft of the stud is laterally deformed after welding through compression so that a force-fit connection results between the shaft of the stud and the inner wall of the hole of the component. Due to the plurality of method steps, the connecting method described here is technically complex and time-intensive.

In German patent applications DE 10 2004 025 492 A1 and DE 10 2007 036 416 A1, rivets, studs or nails are set respectively as welding auxiliary joining parts in components made of non- or poorly weldable material. The tip of the welding auxiliary joining part protrudes on the one side of the component made of non- or poorly weldable material and forms a welding spot with a very small contact surface for contacting the opposite-lying component made of weldable material. As soon as the welding auxiliary joining part and the component made of weldable material are interconnected, for example with the aid of resistance welding in the manner of resistance spot welding or resistance stud welding, the tip or edge of the welding auxiliary joining part is melted or fused so that a so-called weld nugget is formed. Due to the small contact surface between the welding auxiliary joining part and the component made of weldable material on the tip or in the cutting area of the welding auxiliary joining part, the contact zone for welding is relatively small. This prolongs the welding process or impairs the weld connection due to the small contact surface compared to opposite-lying components that contact each other in a larger area. Corresponding to the small contact area between the welding auxiliary joining part and the component made of weldable material, the forming weld nugget turns out small. This impairs, among other things, the mechanical loading capacity as well as the lifespan of the established connection. Moreover, in the case of the use of a semi-hollow punch rivet as the welding auxiliary joining part, a waste slug made of non- or poorly weldable material is created. During subsequent welding, it is located in the welding zone and in the area of the weld nugget so that the quality of the forming weld connection is impaired by this contamination.

Furthermore, it is considered advantageous in DE 10 2004 025 492 A1 to mechanically deform the component made of weldable material in the contact area for the later welding with the aid of the setting process of the welding auxiliary joining part made of non- or poorly weldable material in the component. In particular, a tip or an edge of the welding auxiliary joining part penetrates into the component made of weldable material or creates a recess in this component made of weldable material. This recess should then support the formation of a sufficiently large weld nugget during the resistance welding between the welding auxiliary joining part and the component made of weldable material in the area of this depression or respectively recess. However, in order to realize this method, it is necessary to arrange all components to be interconnected above each other before the welding auxiliary joining part is set. Otherwise, additional work is required to create the recess in the component made of weldable material and to align it with the already set welding auxiliary joining parts. This is complex, time-intensive, also requires additional instrumental effort for the exact positioning of the components to be interconnected and is limited in the selection of the possible welding process and the process sequences.

DE 100 60 390 A1 describes a punch riveting method, in which a punch rivet, with the aid of an electrode punch, is forced through a first electrically non-conductive material, such as for example plastic, and is connected with a second electrically conductive material resting on an electrode die. The electrode punch and the electrode die are connected to opposite poles of a voltage source. As soon as the punch rivet has penetrated the first material and is in contact with the second electrically conductive material, a flow of current takes place through the punch rivet. Since the punch rivet heats due to the flow of current, the further joining process of the punch rivet is thereby supported. Since hollow, semi-hollow or full rivets are used in the punch riveting process described here, the punch rivet drives waste material in front during its joining process through the first electrically non-conductive material. This waste material impedes electrical contact between the punch rivet and the second material and thus the flow of current through the punch rivet. It is also disadvantageous that the punch rivet penetrates the electrically non-conductive material in the cold state, which initiates crack formation and other failure mechanisms specifically in brittle plastics and similar materials.

DE 10 2010 020 569 A1 describes a thermal joining of a first electrically non-conductive component with a second electrically conductive component based on an electrical heating. For this purpose, a joining auxiliary means is first molded in the electrically non-conductive component, which is made of an electrically conductive material. In an installation process taking place before the connecting method, the joining auxiliary means is fastened in the first component by means of rolling, stamping, die-forming, embossing, stretch-forming or gluing. The joining auxiliary means provides the electrically conductive contact for the subsequent electrothermal welding with the second component. For this purpose, the first component with the joining auxiliary means and the second component are positioned between an opposite-lying electrode punch and an electrode die. An electrical flow of current through the joining auxiliary means and the electrically conductive second component between the electrode punch and electrode die leads to a welding of the joining auxiliary means and the second component on adjacent boundary surfaces. Even the thermal joining method described here is disadvantageous in that, first in a previous process, an auxiliary joining means must be fastened in the first component made of electrically non-conductive material. Thus, different processing steps of the auxiliary joining means and of the first component are required here before the first component and the second component can be interconnected between the electrode punch and the electrode die.

EP 0 947 279 B1 describes welding tongs for the resistance welding of layers of sheet metal. These welding tongs comprise a welding current source, a welding current control device connected to said welding current source and a local data storage unit, in which process data from the welding tongs can be saved. The welding current control device has data interfaces for the data transfer, via which the saved programs can be transferred from a program memory to the welding current control device. Furthermore, operating data about the welding tongs recorded via such interfaces can be transferred to a memory, where they are stored permanently or temporarily. Known welding tongs and their operating processes are intended to interconnect several layers of weldable material. However, this approach is no longer sufficient from today's design points of view since non- or poorly weldable materials are increasingly present in the connection of several layers of material.

One object that may be achieved by at least some implementations of the present invention is thus to provide alternative devices and connecting methods, with which layers of non- or poorly weldable material can be connected with layers of weldable material.

3. SUMMARY

The aforementioned object is solved by a combined setting welding device according to the independent patent claim 1, a modular control/regulation apparatus, which is combinable with a setting device or welding tongs, according to the independent patent claim 12, a modular feed apparatus for welding auxiliary joining parts, which is combinable with a setting device or welding tongs, according to the independent patent claim 14, a continuous connecting method in the form of a mechanical-thermal setting welding process with the aid of a stud-like welding auxiliary joining part according to the independent patent claim 16 and a preparation method for welding between a welding auxiliary joining part and a component made of weldable material or with a section of weldable material according to the independent patent claim 23. Advantageous designs and further developments result from the following description, the drawings as well as the dependent patent claims.

The combined setting welding device is designed to set stud-like welding auxiliary joining parts in at least one first layer of material and to subject them to a mechanical thermoforming process on a second layer of material made of electrically conductive material or to an electrically conductive area of the second layer of material and to connect them in a firmly-bonded manner through a welding operation. For this, the combined setting welding device has the following characteristics: a driven punch, which is movable with a setting force of at least 5 kN, preferably at least 8 kN, against an oppositely arranged counter support, while the punch and the counter support are electrically conductive and are designed to be able to be connected with an electric current source so that the punch and the counter support each form a welding electrode, an electronic control system of the setting welding device with a combined control and/or regulation device so that combined mechanical and electrical loads can be generated via the punch and the counter support on the welding auxiliary joining part, which ensure a mechanically and thermally supported penetration of the at least one first layer of material and a planar welding with the second layer of material.

The combined setting welding device integrates in a setting device the possibility of a thermal preprocessing of the welding auxiliary joining part and/or selected areas of the layers of material to be interconnected. Furthermore, the operative prerequisites for performing a welding process, preferably resistance welding, are realized in the setting device so that the welding auxiliary joining part can be fastened by welding on the surface of the second layer of material. For this purpose, the punch and counter support are designed as welding electrodes, so that a sufficiently large welding current can be generated between the punch and counter support via the welding auxiliary joining part. In order to prepare to establish a connection, a current flowing over the welding auxiliary joining part is used to heat the welding auxiliary joining part as well as areas adjacent to the welding auxiliary joining part of one or more layers of material. While this heating electric current can flow on one hand between the punch and counter electrode over the welding auxiliary joining part, it is also preferred, in at least some implementations, that the current flows between the punch, welding auxiliary joining part and a hold down device adjacent to the welding auxiliary joining part. Since in this case no direct electric current flow into the layers of material to be connected takes place, selected areas of the layers of material are heated via the welding auxiliary joining part. The latter case is used especially when the material adjacent to the welding auxiliary joining part is electrically non-conductive.

Although the combined setting welding device creates setting forces in the kN range, the electrical loads of the welding auxiliary joining part serve to generate heat in order to facilitate the setting process of the welding auxiliary joining part in the at least one first layer of material. Furthermore, a targeted reshaping of the welding auxiliary joining part is performed by the combined mechanical and thermal load during the setting process in the at least one first layer of material. A shaping preparation of the later welding of the welding auxiliary joining part with the second layer of material takes place during the setting process due to the thermal softening of the welding auxiliary joining part and/or of the adjacent area of the first layer of material. This ensures that the welding auxiliary joining part is set into the at least one first layer of material, preparatively reshaped and then fastened in a planar manner with the second layer of material by means of welding without a setting or respectively joining in the second layer of material taking place. These processes run continuously so that overall they represent a time-efficient connecting method.

The punch is preferably movable via an electric, hydraulic or pneumatic drive. Furthermore, a force sensor is provided, which senses a force of the punch on the welding auxiliary joining part and/or forwards it to a recording apparatus for mechanical and electrical process data of the electronic control system by means of an electrical reference signal. According to a further embodiment, the electronic control system of the setting welding device comprises a welding apparatus, with which a controllable or regulatable welding current can be generated between the punch and the counter support.

According to a further embodiment, the electronic control system comprises a heating apparatus, with which an adjustable heating of the welding auxiliary joining part and at least one subarea of the layers of material can be generated between the punch and the counter support. This heating apparatus is advantageous for example when heat is generated with the aid of electromagnetic induction or through direct irradiation of thermal radiation or hot air in the welding auxiliary joining part and in the adjacent layers of material. It is naturally also preferred, in at least some implementations, to generate a targeted electric current flow within the welding auxiliary joining part with the aid of the heating apparatus so that it is heated. According to a further embodiment of the setting welding device, a recording apparatus with a plurality of measuring apparatuses is provided, with which electrical and mechanical process data from the setting welding device, preferably current, voltage, power, resistance, force, punch path, temperature, can be recorded and transferred to the recording apparatus of the setting welding device. Furthermore, an evaluation apparatus is provided, with which the mechanical and electrical process data can be evaluated, compared with reference curves and/or characteristic value tables and with which correction values can be determined.

Based on a preferably continuous recording of mechanical and electrical process data during the operation of the setting welding device, the setting process of the welding auxiliary joining part in the at least one first layer of material, the thereby occurring reshaping of the welding auxiliary joining part as well as adjacent material areas of the layer of material for preparing for the subsequent welding, preferably resistance welding, as well as the final welding for connecting the welding auxiliary joining part with the second layer of material can be optimally coordinated with each other. The recording of the mechanical and electrical process data also ensures a learning of the setting welding device so that a constant optimization of operating parameters of the setting welding device takes place. Based on the identification of reference curves and the operation of the setting welding device compared with these reference curves and/or characteristic value tables, a regulation of the mechanical and electric process variables of the setting welding device is preferably possible. Accordingly, the control/regulation apparatus preferably has adjustable control curves for the mechanical and electrical process data of the punch and the counter support, which are regulatable depending on the recorded mechanical and electrical process data from the recording apparatus.

According to a further embodiment, the control and/or regulation apparatus (hereinafter control/regulation apparatus) comprises an adaptive force regulation of the punch so that, with the aid of a force sensor, the force acting on the punch can be recorded and compared with a characteristic value so that a correction force can be readjusted based on the comparison. This adaptive force regulation is preferably used in order to be able to compensate for unevennesses in the stacked layers of material or the effect of adhesive coatings between layers of material arranged on top of each other. The conditions described above falsify the force actually applied by the punch, which can lead to the generation of faulty connections. Correction forces are thus identified with the aid of the adaptive force regulation and introduced to the current connecting method so that the desired connection quality is ensured after completion of the setting welding process.

The setting welding device also preferably has a feed apparatus for welding auxiliary joining parts, with which welding auxiliary joining parts can be fed individually to a joining position or setting position under the punch designed as an electrode. According to one possible design of the feed apparatus, a hold down device is provided, which can be mounted onto the first layer of material in a resilient manner or driven with a controllable force.

According to a further embodiment, the feed apparatus, the welding and/or heating apparatus and the control/regulation module of the setting welding device are designed modularly so that they can be combined respectively with the setting welding device or with known welding tongs or a known setting device.

On the basis of the modular structure described above, a modular control/regulation apparatus, which is combinable with a setting device or welding tongs may also be provided. This modular control/regulation apparatus has the following elements: a recording apparatus for mechanical and/or electrical process data, a welding apparatus, with which a weld connection can be established via a punch and a counter support, preferably an electrode punch and an electrode counter support, of the setting device or of the welding tongs, and a heating apparatus. A feed apparatus for welding auxiliary joining parts is optionally provided in combination with a hold down device.

Furthermore, a modular feed apparatus for welding auxiliary joining parts may be provided, which is combinable with a setting device or welding tongs and which has the following characteristics: a welding apparatus, with which a weld connection can be established via a punch and a counter support, preferably an electrode punch and an electrode counter support, of the setting device or of the welding tongs, and a heating apparatus, with which a welding auxiliary joining part and/or a subarea of a layer of material is heatable, and a resilient or driven hold down device.

The modular control/regulation apparatus described above as well as the modular feed apparatus make it possible to supplement known setting devices and/or welding tongs such that a combined setting welding method is realizable with these known devices. For this purpose, in addition to the targeted supply of welding auxiliary joining parts, the controlling or regulation of mechanical and electrical operating parameters of the setting device or of the welding tongs is required. Such operation can only be realized with the aid of the corresponding welding apparatus. It is thus preferred in at least some implementations to provide both the modular control/regulation apparatus as well as the modular feed apparatus as an additional option or as a retrofit kit for setting devices and welding tongs. The modular feed apparatus is preferably connected with a recording apparatus for electrical and mechanical process data, an evaluation apparatus as well as with a data interface to an electronic control system of the setting device or the welding tongs.

Also disclosed is a continuous connecting method in the form of a mechanical-thermal setting welding process with the aid of a stud-like welding auxiliary joining part for at least one first layer of material without prepunching the at least one first layer of material with at least one second layer of material made of weldable material or with a section made of weldable material. The continuous connecting method has the following steps: driving of the welding auxiliary joining part into the at least one first layer of material under a combined mechanical-thermal load of at least one welding auxiliary joining part, deforming of the welding auxiliary joining part under a combined mechanical-thermal load on the at least one second layer of material and planar welding of the welding auxiliary joining part with the at least one second layer of material so that the at least one first layer of material and the at least one second layer of material are interconnected via the welding auxiliary joining part, wherein during the driving in, deforming and welding of the welding auxiliary joining part the force applied to the welding auxiliary joining part by the punch and the counter support, preferably the electrode punch, and the electric current generated by the electrode punch in the welding auxiliary joining part are specified depending on the time with the aid of adjustable superimposed force and current characteristic lines in order to continuously control the connecting method.

During the continuous connecting method, combined mechanical and electrical loads are preferably applied to the welding auxiliary joining part and the layers of material to be interconnected. The electrical load of the welding auxiliary joining part generates heat, which supports the driving of the welding auxiliary joining part into the at least one first layer of material. This heat generated in this manner electrically or with the aid of other heat sources in the welding auxiliary joining part and the neighboring layers of material leads to a softening of the material of the welding auxiliary joining part and/or of the material at least of the first layer of material, so that a reduced force of the punch is required during the driving in of the welding auxiliary joining part. The supplied or respectively generated amount of heat is thereby adjusted such that it does not lead to a melting of the material of the welding auxiliary joining part and the layers of the material. The melting temperature of the material is thus preferably not reached during the deforming and reshaping of the welding auxiliary joining part.

The combination of a mechanical driving in or setting step with a heating step facilitating the driving in of the welding auxiliary joining part leads additionally to an active reshaping of the welding auxiliary joining part in preparation for the subsequent welding process. The heat supply to the welding auxiliary joining part and the at least one adjacent layer of material as well as the force effect and movement of the welding auxiliary joining part during the driving into the at least one layer of material lead to an efficient reshaping of the welding auxiliary joining part in preparation for the preferred resistance welding. This active reshaping under combined mechanical and thermal loads also profits from the impact of the welding auxiliary joining part on the second layer of material during the driving in. The welding auxiliary joining part is thereby preferably compressed on the second layer of material so that it results in an advantageous enlargement of the boundary surface between the welding auxiliary joining part and the second layer of material. This boundary surface enlargement supports the later formation of a weld nugget suitably set in its planar size and the weld connection built on it between the welding auxiliary joining part and the surface of the second layer of material.

For an efficient flow of the connecting method, the force/time/path characteristic line of the punch as well as the current/time/path characteristic line for heat generation in the welding auxiliary joining part are coordinated in order to avoid an energy overload of the material of the welding auxiliary joining part and/or of the material of the layers of material adjacent to the welding auxiliary joining part. At the same time, this coordination serves to set optimized parameters for the "driving in" and "deforming" phases with respect to material properties of the welding auxiliary joining part and the layers of material. Correspondingly, the force characteristic line and the current characteristic line are designed such that the force of the electrode punch is reduced during the deforming and the current flowing in the welding auxiliary joining part is increased so that, under a mechanical base load, a shape adjustment takes place between the welding auxiliary joining part and the adjacent layers of material in the reshaping step already named above.

In a further embodiment, the connecting method preferably comprises the further steps: sensing of mechanical and electrical process data, in particular force, punch path, electrical voltage, electric current, comparison of recorded process data with specified reference curves and/or characteristic value tables and determination of control values for mechanical and electrical loads applied to the welding auxiliary joining part based on the comparison between the recorded process data and the reference curves and/or characteristic value tables for targeted setting of the mechanical-thermal load on the welding auxiliary joining part.

Based on the targeted setting and changing of the operating parameters of the setting welding device, the reshaping already described above at least of a tip and/or shaft area of the welding auxiliary joining part thus preferably takes place during the driving in and deforming of the welding auxiliary joining part so that the welding auxiliary joining part is prepared for the subsequent planar welding with the at least one second layer of material. Based on this method foundation, a boundary surface area between the at least one second layer of material and the reshaped tip area of the welding auxiliary joining part that is sufficiently large for a resistance welding process is generated in which the welding zone is formed during the welding.

Based on the continuous connecting method described above, a preparation method is also disclosed for a welding process between a welding auxiliary joining part and a layer of material made of weldable material or a layer of material with a section of weldable material. This preparation method has the following steps: targeted reshaping of at least one tip and/or shaft area of the welding auxiliary joining part during the driving in and deforming of the welding auxiliary joining part under combined mechanical-thermal loads so that the welding auxiliary joining part is prepared for the subsequent planar welding with the at least one second layer of material. The preparation method thus represents a selected section of the continuous connecting method described above, which can be integrated into known setting processes and combined with a final welding process.

A boundary surface area between the at least one second layer of material and the preformed tip area of the welding auxiliary joining part that is sufficiently large for a resistance welding process is generated preferably during the reshaping of the preparation method. This boundary surface area supports the formation of a planar weld nugget in the later welding process.

4. BRIEF DESCRIPTION OF THE ACCOMPANYING DRAWINGS

Figure 1B:
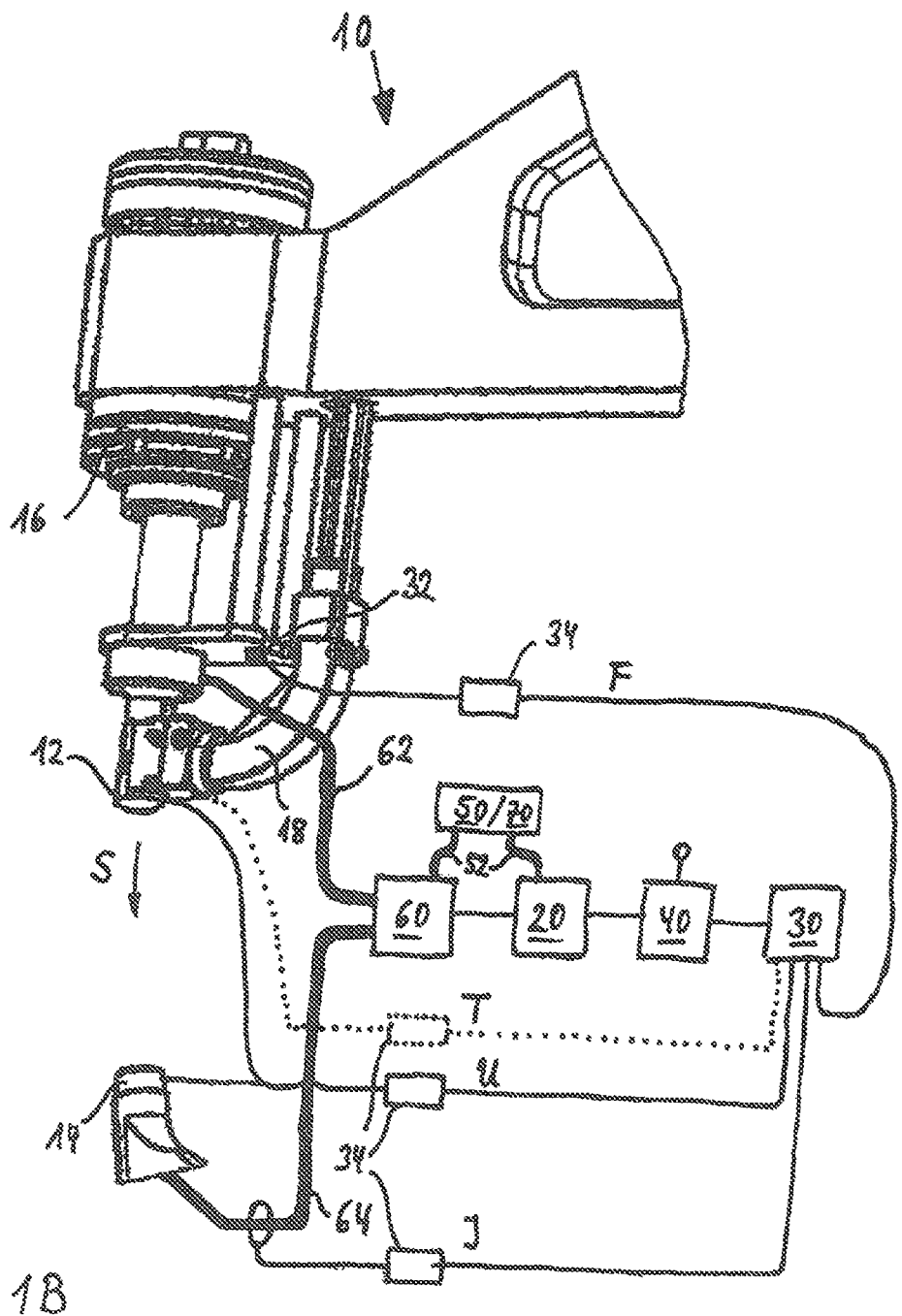
Figure 4:
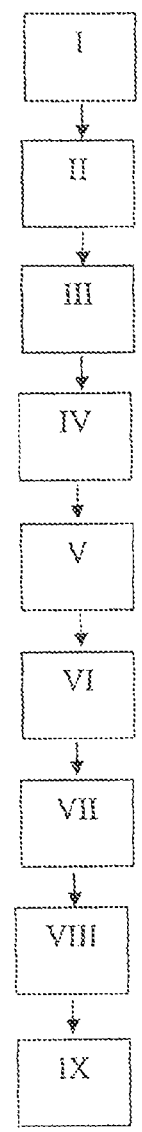

The present disclosure is made in greater detail in reference to the preferred embodiments of the invention shown in the accompanying drawings. The figures show in:

FIG. 1A a schematic representation of a presently preferred embodiment of the setting welding device, FIG. 1B a schematic representation of a further embodiment of the setting welding device, FIG. 2 a sequential representation of an embodiment of the connecting method as well as the corresponding characteristic line progression, FIG. 3 a further sequential representation of an embodiment of the connecting method as well as the corresponding characteristic line progression, and FIG. 4 a flow diagram of an embodiment of the connecting method.

5. DETAILED DESCRIPTION

FIG. 1A shows schematically an embodiment of a setting welding device 10, which is rigidly installed or which is arranged in a movable manner via a robot arm or which is constructed as a mobile setting welding device 10. With the setting welding device 10, stud-like welding auxiliary joining parts (see FIGS. 2 and 3) are set or driven into at least one first layer of material A under combined mechanical and electrical loads on punches or counter supports of the setting welding device 10. Such welding auxiliary joining parts and their construction are described in detail in DE 10 2012 018 866, which are incorporated herein by reference. The electrical loads generate a current flow in the welding auxiliary joining part so that it is heated. This thermal load of the welding auxiliary joining part, which is in addition to the mechanical load, and of the areas of the at least one first layer of material A adjacent to the welding auxiliary joining part supports the driving of the welding auxiliary joining part into the at least one first layer of material A. A representation of a further embodiment of the setting welding device 10 is shown in FIG. 1B.

The welding auxiliary joining part is not set, joined or driven into the second layer of material B made of weldable material or with sections of weldable material. A planar welding of the welding auxiliary joining part, preferably by means of resistance welding, takes place on the surface of the second layer of material B. In this manner, the at least one first layer of material A and the second layer of material B can be interconnected via the welding auxiliary joining part in a combined continuous setting welding process. During the operation of the setting welding device 10, the stud-like welding auxiliary joining part is fed with the aid of a feed apparatus 18 individually to a joining position under the punch 12 (seen in the joining direction) of the setting welding device 10. The feed apparatus 18 preferably comprises a hold down device NH, which presses against the layers of material A, B arranged on top of each other with the aid of a spring or another suitable drive. The hold down device NH preferably pushes on the first layer of material A with a controllable force so that intermediate spaces between the layers of material A, B arranged on top of each other are mainly closed and the layers of material A, B are fixed in their operating position between punch 12 and counter support 14.

The setting welding device 10 comprises the punch 12 already mentioned above and the counter support 14 arranged opposite the punch 12. The punch 12 and the counter support 14 can generate both mechanical as well as electrical loads in the welding auxiliary joining part in that they are designed as electrode punches and electrode counter supports. The movement of the punch 12 and thus the force applied to the welding auxiliary joining part is generated by a drive 16. According to various preferred embodiments, this drive 16 is realized pneumatically, electrically or hydraulically. The drive 16 is also activated via a control and/or regulation apparatus 20 (hereinafter control/regulation apparatus 20).

The punch 12 and the counter support 14 are supplied with electric current via power lines 62, 64. Since the punch 12 and the counter support 14 are made of electrically conductive material, the electrical potentials supplied to the punch 12 and the counter support 14 are forwarded to electrically conductive layers of material A, B and the welding auxiliary joining part so that an electric current flow can take place. This electric current flow is preferably used on one hand to heat the areas through which current flows and on the other hand to weld the welding auxiliary joining part with the second layer of material B (see below).

The aforementioned electrical loads are activated with the aid of the control/regulation apparatus 20. For this, the control/regulation apparatus 20 preferably controls a welding transformer 60 via a welding apparatus 50, as described in greater detail below.

The adjustable electric currents supplied to the punch 12 and the counter support 14 serve on one hand to perform the welding process. In particular, a stud-like welding auxiliary joining part is preferably welded on the layer of material B made of weldable material or on sections of weldable material within the second layer of material B in a planar manner. This welding, which is not preceded by a setting of the welding auxiliary joining part into this second layer of material B, takes places on the surface of the second layer of material B preferably via an electrical resistance welding. The supplied electric currents also serve to heat the welding auxiliary joining part and neighboring areas of the layers of material A, B to be interconnected. According to an embodiment, the welding apparatus 50 thus serves as a heating apparatus 70 in order to generate in a targeted manner heating electric currents at least in the welding auxiliary joining part. It is also preferred, in at least some implementations, to generate these heating electric currents with a heating apparatus.

Measuring apparatuses 34 are provided in order to be able to sense the electrical and mechanical loads on the punch 12 and on the counter support 14. The measuring apparatuses 34 preferably sense electrical and mechanical process data like the electric current, the electrical voltage, the electric power, the electrical resistance, the force and the punch path. With the aid of corresponding reference signals, the sensed mechanical and electrical process data is transmitted to the recording apparatus 30. The recording apparatus 30 preferably transmits the received process data to an evaluation apparatus 40. The recorded mechanical and electrical process data of the setting welding device 10 is compared there with saved reference curves and/or characteristic value tables of operating parameters of the setting welding device. In the case of deviations between saved reference curves and/or characteristic value tables and the determined process data of the setting welding device 10, correction values can be determined for the respective operating parameters of the setting welding device 10. These correction values are then forwarded from the evaluation apparatus 40 to the control/regulation apparatus 20 in order to take them into consideration during activation of the setting welding device 10. With respect to the regulation of the punch force, e.g. a force sensor 32 determines the punch force which acts on the welding auxiliary joining part. After forwarding the punch force to the recording apparatus 30, it is compared with the activated punch force in the evaluation apparatus 40. If required, the evaluating comparison provides a correction value of the punch force, which is activated via the control/regulation apparatus 20. One example of the use of such a regulation is the adaptive force regulation, as explained in greater detail below.

For controlling the setting welding device 10, adjustable control curves are saved in the control/regulation apparatus 20, which specify the mechanical and electrical operating parameters of the setting welding device 10. During the operation of the setting welding device 10, the control curves, e.g. for the setting force of the punch 12 or for the electric current flowing over the punch 12 and counter support 14, are compared with the recorded mechanical and electrical process data in the evaluation apparatus 40. The mechanical and electrical control curves are saved in the evaluation apparatus 40 in the form of reference curves and/or characteristic value tables or are calculated in advance for an adaptive regulation based on the determined measurement values.

The control/regulation apparatus 20 activates both the mechanical as well as the electrical loads, which are applied to the welding auxiliary joining part and the layers of material A, B arranged between them via the punch 12 and the counter support 14. The control/regulation apparatus 20 thus actuates the drive 16 as well as the feed apparatus 18 of the setting welding device 10. Furthermore, the control/regulation apparatus 20 actuates the programmable welding apparatus 50, in which a welding controller adjusted for the operation of the setting welding device 10 can be stored. In particular, the welding apparatus 50 regulates the preparation of a primary welding current for the welding transformer 60 via the primary power line 52. The welding transformer 60 is connected with the punch 12 and the counter support 14 designed as electrodes via the lines 62, 64. Starting from the welding apparatus 50, the primary current is delivered to the welding transformer 60 via the primary power line 52. The welding transformer 60 converts the current into a suitable secondary welding current so that resistance welding can take place according to the material combination of welding auxiliary joining part and second layer of material B.

For preparing the control curves stored in the control/regulation apparatus 20 for the mechanical and electrical operating parameters of the setting welding device 10, series of tests are performed on the materials to be interconnected later on. A learning of the control/regulation apparatus 20 takes places via these series of tests, in which the operating parameters of the setting welding device 10 to be used later are saved. These operating parameters include the clamping and setting force to be realized by the punch 12, the electric current profile to be generated via the punch 12 and the counter support 14 within the welding auxiliary joining part and the layers of material A, B to be connected with it over the entire time of the joining and welding process (see FIGS. 2 and 3). Furthermore, within the framework of such preparatory series of tests, the welding currents and welding times required for the permanent and efficient welding of welding auxiliary joining part and second layer of material B as well as the upstream heating currents and interstage current reduction phases for cooling are tested and defined by the setting of the advantageous or respectively optimized operating parameters.

As already shown above, the welding apparatus 50 can be programmed for the operating parameters of the setting welding device 10 to be realized. For the realization of an efficient planar welding of the welding auxiliary joining part with the second layer of material B, it is necessary that a sufficiently large primary current potential is present in order to achieve the necessary secondary current based on the transformer turns ratio. Since known materials, such as a welding auxiliary joining part made of steel with a second layer of material B made of steel, are to be welded together here, known welding apparatuses and welding transformers for resistance welding can be used.

During the setting or respectively driving of the welding auxiliary joining part into the at least one first layer of material A, a reshaping of the welding auxiliary joining part for the subsequent welding process takes place under the combined mechanical-thermal loads. In order to realize this reshaping, the electric current and the heat generated with it must be set to a level below the value at which a melting of the welding auxiliary joining part and of the material of the at least one first layer of material A takes place. However, this current value must be sufficiently high in order to realize a softening of the material of the welding auxiliary joining part and of the material of the at least one first layer of material A. During the softening of the material, its ductility is increased through temperature increase or respectively heat supply. A plastic deformation is thereby possible with less force than without heating.

Based on this controlled softening, a reshaping of the welding auxiliary joining part in preparation for the subsequent welding process is simultaneously realized during the driving of the welding auxiliary joining part into the at least one first layer of material A. This reshaping takes place mainly in the shaft area and in the tip area of the welding auxiliary joining part. The tip area or respectively the tip of the welding auxiliary joining part is thereby blunted and the shaft area is expanded in the radial direction (see FIG. 2 picture b) and c)). As a result of this reshaping, a welding auxiliary joining part with a sufficiently large contact surface between the welding auxiliary joining part and the second layer of material B results. The generation of a sufficiently large contact surface between the welding auxiliary joining part and the second layer of material B is also preferably supported in that the softened welding auxiliary joining part is compressed at the end of the driving-in process on the second layer of material B (see FIG. 2 picture d)). According to the material of the welding auxiliary joining part and the layers of material A, B to be interconnected as well as depending on the dimensioning of the welding auxiliary joining part and the thicknesses of the layers of the material A, B to be interconnected, the punch forces and the activated electric currents are to be set for heating and softening the material.

According to a further embodiment, the feed apparatus 18, the welding and/or heating apparatus 50/70 and their control/regulation apparatus 20 are provided modularly. This means that they are removable from the setting welding device 10 in their unit and are combinable with it. This also makes it possible that the named modular devices can be combined with other welding tongs or known setting devices.

In this connection, it is also preferable to provide a separate modular control/regulation apparatus 20. This modular control/regulation apparatus 20 is combinable with a setting device or welding tongs according to a generally known design so that the functionality of the setting welding device is given in this manner to the setting device or the known welding tongs. For this, the modular control/regulation apparatus 20 comprises the recording apparatus 30 for mechanical and/or electrical process data already discussed above, the welding apparatus 50 discussed above, with which the weld connection can be established via the electrode punch 12 or the electrode counter support 14 of the setting device or of the welding tongs, or a heating apparatus 70. Should the setting device or the welding tongs that is/are to be combined with the modular control/regulation apparatus 20 still have no electrode punch 12 and no electrode counter support 14, it is naturally required to realize a corresponding electrically conductive punch 12 as an electrode punch and an electrically conductive counter support 14 as an electrode counter support on this setting device or these welding tongs. Furthermore, the modular control/regulation apparatus 20 comprises the feed apparatus 18 also discussed above for welding auxiliary joining parts in combination with a hold down device. This hold down device has the same properties as the hold down device already described above.

In at least some implementations, it may also be preferable to combine the devices described above or a portion of the devices described above in a modular feed apparatus for welding auxiliary joining parts, which is combinable with a setting device or welding tongs of the known design. This modular feed apparatus comprises the welding apparatus 50 described above, with which the weld connection can be established via the discussed electrode punch 12 and the electrode counter support 14 of the setting device or of the welding tongs, or/and the heating apparatus 70, with which the welding auxiliary joining part and/or at least one subarea of adjacent layers of material are heatable. The modular feed apparatus also comprises the flexible or driven hold down device already discussed above. According to a further embodiment, the modular feed apparatus also has the recording apparatus 30 for the mechanical and electrical process data described above as well as a data interface to an electronic control system of the setting device or the welding tongs.

With the aid of the modular control/regulation apparatus 20 described above as well as the modular feed apparatus 18, retrofit kits for known setting devices and/or welding tongs are provided, which enable a retrofitting of known setting devices and/or welding tongs to the setting welding device. It is thus also preferable to provide the modular control/regulation apparatus 20 and/or the modular feed apparatus 18 as accessory kit so that they can be combined similar to a modular system with known setting devices and welding apparatuses.

Referring to FIGS. 2, 3 and 4, the continuous connecting method is described below based on a mechanical-thermal setting welding process. This method is preferably performed with the setting welding device 10 described above and shown schematically in FIG. 1. According to further embodiments, a known setting device is combined with the modular control/regulation apparatus 20, the modular feed apparatus and a welding apparatus in order to obtain a suitable setting welding device for performing the method (see above). Based on the modular principle already mentioned above with the aid of the modular control/regulation apparatus 20 and the modular feed apparatus, different alternative possible combinations are now created so that the continuous connecting method or a discontinuous connecting method can be performed with the resulting device. Thus, known welding tongs are preferably combinable with the modular feed apparatus 10 with hold down function or with a separate hold down device. Devices for determining the force as well as the evaluation apparatus are also provided on these welding tongs in order to regulate the mechanical-thermal setting processes. Furthermore, it is preferred, in at least some implementations, to record the welding tongs additionally with a measuring apparatus for measuring the heat in the welding auxiliary joining part and/or in neighboring layers of material. Based on this, regulation devices are provided, which enable a targeted adjustment of the heat supplied to the joint. With the aid of the evaluation apparatus already named above, the data recorded by the measuring apparatuses are evaluated and transmitted to a control device of the welding tongs. With the aid of the transmitted data, the control device of the welding tongs is able to realize continuous and discontinuous connecting methods.

The existing punch and the counter support are converted into an electrode punch and an electrode counter support at a known setting device. This takes place according to an alternative embodiment, in which welding electrode caps are placed on the punch and the counter support. The current supply to the punch of the setting device then takes place via these welding electrode caps. With the aid of preferred current and voltage measuring apparatuses, the heating, electric current can be recorded and evaluated both before the welding and during the reshaping step as well as the later welding current during the welding of the welding auxiliary joining part and the second layer of material. The evaluation takes place in the evaluation apparatus already discussed above, which is connected with the controller of the setting device. Based on the data received by the evaluation apparatus, the controller of the setting device is able to activate in a targeted manner mechanical loads as well as additional electrical loads in the welding auxiliary joining part and on the joint. According to an embodiment, the possibility of activating the electrical loads is received in the controller of the known setting device by additional control software.

Furthermore, the combination of possibilities described above or respectively the modular systems described above may be provided with an additional temperature measuring apparatus for near-element temperature measurements. This temperature measurement determines the temperature of the welding auxiliary joining part and/or the at least one first layer of material A. As soon as the temperature has been recorded by the temperature measuring apparatus, it is forwarded to the controller and a heating apparatus connected thereto with the aid of suitable data transmission means. Since the controller of the setting device and/or the heating apparatus comprises a control or regulation program for the heating at the joint, the currents required for the heating are activated accordingly via the controller and/or the heating apparatus. In this connection, it is also preferred, in at least some implementations, to monitor the heat supply at the welding auxiliary joining part and/or the first layer of material A with the aid of the force of the punch recorded at the joint. Should a sudden drop in force take place during the progression of the force depending on the punch path or the time, this indicates an overheating or energetic overload of the material at the joint. This includes both an overheating of the welding auxiliary joining part as well as an overheating of the neighbouring areas of the first layer of material A.

Within the framework of the connecting method to be performed continuously or discontinuously, the at least one first layer of material A and the at least one second layer of material B made of weldable material or with areas made of weldable material are first (step I) arranged in a stack between the punch 12 and the counter support 14. After supply of a welding auxiliary joining part in the joining direction below the punch 12, the drive 16 moves the punch 12 and thus the welding auxiliary joining part in the joining direction S. The welding auxiliary joining part is thereby placed on the stack of layers of material A, B. The layers of material A, B are also pushed against each other so that intermediate spaces between the layers of material A, B are closed. In this phase, the force F applied by the punch 12 is low and hardly reproducible because intermediate spaces filled with air or glue between the layers of material A, B are closed and the stack gives way accordingly. This phase is thus not drawn in the force/path characteristic line of the punch 12 according to FIG. 2 or 3. This phase is shown schematically in picture a) from FIG. 2.

According to an embodiment, the packet made up of layers of material A, B is not pushed together and held with the punch 12 but rather with a hold down device NH on a block. The hold down device fulfils here the same function as the punch 12 did previously in combination with the welding auxiliary joining part. An electrical load and thus a thermal load are thereby generated in the welding auxiliary joining part neither via the punch 12 nor via the hold down device (see FIG. 3).

The diagram in FIG. 2 shows a force/path/time characteristic line (solid line) and a current/path/time characteristic line (dotted line). The time or the path of the punch 12 is applied qualitatively on the X axis.

In step II, the punch 12 is moved in joining direction S via the drive 16 and the force F acting on the punch 12 is thus increased. This can be seen on the continuously rising force characteristic line in FIG. 2. Alternatively, the control system of the combined setting welding device 10 is also able to record the start of step II based on a clear force increase in the force characteristic line, while only an indifferent force progression was seen previously in step I. According to the strength of the at least one first layer of material A, into which the welding auxiliary joining part should be driven or respectively set, a force $F_A$ as well as a time span $t_A$ are preferably specified by the control/regulation apparatus 20, in which the initial force $F_A$ should be applied to the welding auxiliary joining part. The initial force preferably lies at $F_A$>5 kN, further preferably at >8 kN. The initial force $F_A$ and the time span $t_A$ are selected such that setting processes can take place in the pressed-together packet of layers of material A, B. Glue could also be displaced or distributed between the layers of material A, B. An indifferent force progression thus does not occur but rather a relatively steep force increase, as shown by the force characteristic line in FIGS. 2 and 3.

Moreover, the initial force $F_A$ is sufficiently high so that a first penetration of the welding auxiliary joining part into the layer of material A takes place. The measurement of the punch force with the force sensor 32 is preferably performed directly on the punch 12 or indirectly on the counter support 14. The recording of the force then takes place in the recording apparatus 30 and the evaluation in the evaluation apparatus 40.

A step III describes the setting phase of the welding auxiliary joining part, in which the welding auxiliary joining part is driven or respectively set into the at least one layer of material A. A flowing transition between steps II and III preferably takes place without interrupting the continuous connecting method. During the setting phase, the punch force is first still set to its maximum value according to the force characteristic line in FIG. 2. It is also preferred, in at least some implementations, that the punch force increases continuously as long as a driving of the welding auxiliary joining part into the layer of material A takes place simultaneously. According to a further alternative to the method, the setting force increases up to a maximum value $F_A$ and then falls again continuously. The force characteristic line is adjustable depending on the material of the layer of material A as well as the shape of the stud-like welding auxiliary joining part in order to realize an optimal driving in of the welding auxiliary joining part.

In order to support the setting process, an electric current I is generated by the heating apparatus 70 or the welding apparatus 50 via the punch 12 and the counter support 14 in the welding auxiliary joining part and in the electrically conductive layers of material A, B (see picture b) in FIGS. 2 and 3). The electric current I is sufficiently large based on the material selection of the layer of material A and of the welding auxiliary joining part as well as based on the corresponding preliminary tests (see above) so that the heat thereby generated in the welding auxiliary joining part and in the layer of material A generates a softening of the material, preferably in the tip area and/or in the shaft area of the welding auxiliary joining part. However, the material of the welding auxiliary joining part and of the adjacent layers of material A, B is not heated enough by this heat supply in the welding auxiliary joining part and thus in the joint zone for material damage, joint conversion or a melting of the material impeding the setting to occur in the joint zone.

The heat generated in the welding auxiliary joining part is also emitted to the adjacent areas of the layers of material A, B. According to a further alternative to the method, heat is also generated by an electric current flow in the layer of material A. According to another additional or alternative method, the welding auxiliary joining part and a subarea of the layer of material A are heated by an additional indirect heating by a separate optional heat source. In this manner, a softening of the layer of material A also takes place in the joining area during the setting phase of the welding auxiliary joining part. This thermal load facilitates the setting of the welding auxiliary joining part in the layer of material A, so that the punch force F is thereby advantageously and preferably reduced, in particular continuously reduced.

Since the force $F_{III}$ of the punch 12 and the heat generated by the current $I_{III}$ complement one another during the setting process, $F_{III}$ is preferably reduced at a constant current strength $I_{III}$ (alternative 1). Alternatively and preferably, the punch force $F_{III}$ and the current strength $I_{III}$ are lowered to an all but constant value so that they form together the optimally complementing setting load for the welding auxiliary joining part (alternative 3). According to a further alternative to the method, only a relatively small electric current is generated in the welding auxiliary joining part so that the welding auxiliary joining part is driven in further with almost constant punch force F (not shown).

Furthermore, it is preferred, in at least some implementations, to adjust the punch force F as a function of the current I. In this manner, an optimal energy input into the welding auxiliary joining part is also adjustable for setting in the at least one layer of material A without disadvantageously impacting the material of the welding auxiliary joining part and/or the material of the layer of material A (alternative 2) (see phase III in FIGS. 2 and 3).

As soon as the material of the welding auxiliary joining part and preferably the material of the layer of material A have been sufficiently softened by the supplied heat, a plastic reshaping phase of the welding auxiliary joining part takes place during the setting process (step IV). If the supplied heat or the amount of heat generated by the electric current is sufficiently large in order to also only soften the material of the layer of material A, the reshaping phase takes place simultaneously on the welding auxiliary joining part and in the at least one layer of material A. This is also the case when the layer of material A is made of electrically non-conductive or electrically conductive material. A complementary shape of the welding auxiliary joining part and of the surrounding layer of material A, at least in the shaft area, results from the aforementioned simultaneous plastic reshaping of the at least one layer of material A and the also deforming welding auxiliary joining part around it.

A blunting of the tip area of the stud-like welding auxiliary joining part results due to the softened material already during the setting process of the welding auxiliary joining part in the layer of material A. The reshaping phase continues even when the setting process of the welding auxiliary joining part in the layer of material A is almost complete (see picture c) in FIG. 2). While the punch 12 continues to apply force to the welding auxiliary joining part, the softened welding auxiliary joining part hits the second layer of material B and is compressed there almost without penetrating but with correspondingly intensive contact. The compression of the tip area and preferably of the shaft of the welding auxiliary joining part leads to an enlargement of a contact surface between the welding auxiliary joining part and the layer of material B. The contact surface enlargement serves to prepare for the later welding of the welding auxiliary joining part with the layer of material B made of weldable material or with an area made of weldable material. At the same time, the softened material of the welding auxiliary joining part can spread out radially preferably in the shaft area of the welding auxiliary joining part during the compression so that the welding auxiliary joining part can be driven further radially into the layer of material A. In this manner, a reliable form and preferably force fit and/or an undercut of the welding auxiliary joining part supporting the connection is formed in the joining area between the welding auxiliary joining part and the at least one layer of material A. This process is preferably ended as soon as the head of the welding auxiliary joining part rests on the layer of material A.

In this connection, it is also conceivable to not drive the welding auxiliary joining part so far into the at least one layer of material A until the head of the welding auxiliary joining part rests on it. Should e.g. the head of the welding auxiliary joining part fulfill a certain fastening function, it can be advantageous that the head has a certain distance from the top side of the at least one layer of material A. Another option is that the stud-like welding auxiliary joining part does not have a head extending radially over the shaft diameter so that it cannot come to rest on the layer of material A but rather is driven in flush. Furthermore, a head protrusion serves to make additional material available for the subsequent welding process. Through further setting of the welding auxiliary joining part during welding, this material volume is supplied for filling in gaps in the weld nugget and displaced into potential hollow spaces. This optionally supports the connection with additional surface connection due to the displaced material.

In order to not overheat the joint zone with the welding auxiliary joining part and the at least one layer of material A, it may be preferred to already shut down the current and thus the heat supply to the joint zone during the compression or respectively reshaping of the welding auxiliary joining part. According to one embodiment, the heat stored in the material is sufficient to complete the setting process of the welding auxiliary joining part. By shutting down the electric current or the heat supply, the materials of the welding auxiliary joining part and of the neighboring layer of material A can optionally cool so that an overheating does not take place during the subsequent welding. Weld spatters are for example thereby mainly avoided.

In an optional step V, a current peak $I_P$ is generated in order to generate a temporary heat moment at the contact surface between the welding auxiliary joining part and the second layer of material B. With the aid of this heat moment, potential contaminations on the contact surface between the welding auxiliary joining part and the layer of material B are eliminated, preferably burned up.

The layers of material A, B to be interconnected and the welding auxiliary joining part are held with a certain clamping force by punch 12 and/or hold down device NH due to the preceding setting process. In a continuous connecting method, the welding of the welding auxiliary joining part with the layer of material B takes place in the following steps VI-IX based on known spot welding methods. According to an embodiment, the welding apparatus 50 regulates for this a current at punch 12 and counter support 14, which reduces and stabilizes an electrical resistance at the boundary surfaces between punch 12 and welding auxiliary joining part, welding auxiliary joining part and layer of material B as well as between layer of material B and counter support 14 to a constant and low value. The reproducibility of the plurality of individual welding spots in the series is thereby preferably improved. The electric current thereby increases from approx. 2 kA to up to 5-10 kA. A current strength is thereby adjusted, which lies slightly below the current value at which a melting of the material of the welding auxiliary joining part and the layer of material B takes place right at the contact surface between welding auxiliary joining part and layer of material B. The current is typically maintained for a period of 10-100 ms. This ensures that the low value of the resistance is set. The activated high current strength leads to an adjustable and thus preferably controllable and/or regulatable heating of the areas through which current flows so that the contact between punch 12 and welding auxiliary joining part as well as between the counter support 14 and the adjacent layer of material B is preferably further improved and stabilized. In order to reduce, if applicable, the heat load of the areas through which current flows for an optimal following welding process, the current is temporarily shut down or reduced according to a further alternative to the method and optionally. However, this does not impair the targeted lower resistance value (see above).

In the subsequent step VII, the welding apparatus 50 activates a current strength of approx. 15-50 kA, preferably 20-40 kA, which is high compared to the previously activated currents, via the welding transformer 60 in a temporally short current increase phase. This current strength is achieved in particular at an interval of 5-20 ms.

The formation of the weld nugget SL is started through the current step in step VII to a current strength, which lies clearly above the value, at which a melting of the material takes place on the contact surface between welding auxiliary joining part and layer of material B. The current step is comparable with an initial welding impulse, whereby a joint melting and conversion is triggered in the contact surface area between the welding auxiliary joining part and layer of material B. The formation of a weld nugget SL first takes place on the surface or preferably in the upper third with respect to a thickness of the layer of material B seen in the joining direction since the welding auxiliary joining part has almost not been set in the layer of material B. The weld nugget SL is thus preferably designed in a planar manner and extends in radial extension around the compressed tip area of the shaft of the welding auxiliary joining part. Due to the insignificantly low penetration depth of the welding auxiliary joining part into the layer of material B, a weld nugget SL does not result with a predominantly axial extension compared to its radial expansion with respect to the shaft of the welding auxiliary joining part.

The welding current generating the weld nugget SL is held for a period of 5-60 ms, preferably 10-50 ms, in order to form the weld nugget SL in its shape. The current strength is set in a range of 10-50 kA. The welding parameters current and welding duration are to be set depending on the material of the layers of material A, B, the material of the welding auxiliary joining part as well as the thicknesses of the layers of material A, B and the dimension of the welding auxiliary joining part. Corresponding preliminary tests (see above) preferably deliver the material- and dimension-adjusted force and current characteristic lines for the welding. In order to improve the reproducibility of the plurality of welding spots in the series production, the parameter values received in the previous process sections can also be comparatively evaluated.

A size of the weld nugget SL is preferably set in step VIII with the aid of a reduced current strength compared to step VII. The current strength lies below the current strength $I_{VII}$ from step VII and above the current strength $I_{VI}$ from step VI. Depending on the material combination already discussed above and the present material layer thicknesses and the dimension of the welding auxiliary joining part, the current strength $I_{VIII}$ acts over a period of 15-300 ms, preferably 25-250 ms.

The current is preferably moved to zero in step IX. The can occur continuously or in the form of a shutdown procedure. Thus no further heat supply takes place in the joint zone so that the welding auxiliary joining part and the adjacent layers of material A, B cool down. During the cooling phase, the clamping force $F_{IX}$ is held at a constant value or preferably increased. An increase in the clamping force between punch 12 and counter support 14 supports the joint formation in the welding zone in order to obtain a reliable connection (see picture e) in FIG. 2).

Finally, the punch 12 is moved away from the stack of layers of material A, B in order to remove the layers of material A, B with joint.

It was identified that force shunts in the stack of layers of material A, B can lead to a falsification of the punch force, the electrical resistance and additional process parameters. Force shunts occur from shape deviations in the layers of material A, B, through a viscoelastic behavior of an adhesive between the layers of material A, B or through impurities between the layers of material A, B. These force shunts cause the force activated by the control/regulation apparatus 20 via the punch 12 to be lower than specified. However, a joining force of punch 12 that is too low impairs the quality of the connection to be established. A punch force that is too low increases for example the probability of disadvantageous weld spatters during the welding. The activated current value is thus preferably compared with the actually present force value measured by the force sensor 32 and a force correction value is determined in the evaluation apparatus 40 within the framework of the adaptive force regulation. This correction value is transmitted to the drive 16 of the punch 12 via the control/regulation apparatus 20 in order to achieve the activated force required for the welding process.

According to the schematically represented method flow in FIG. 3, the welding auxiliary joining part is set and welded with the aid of a hold down device NH. The hold down device NH preferably serves to apply a mechanical clamping force for fixing the layers of material A, B. It also may be preferred to generate an electric current flow and thus heat via the punch 12 and the hold down device NH in the welding auxiliary joining part and in the adjacent areas of the layers of material A, B, as described in DE 10 2012 018 866. The different alternatives for constructing the punch, hold down device and counter support described there are combinable and realizable in combination with the method described above. The connecting method described above takes place in the same manner if a hold down device NH is used.

It is also conceivable to support near-element the heat generation through the current flow via the welding auxiliary joining part through an additional separate heat source in order to limit the current flow through the welding auxiliary joining part in the setting/reshaping phase. These values can also be supplied to the control/regulation apparatus 20 for an adjustment of the current and force regulation processes via a temperature measurement on the near-element surface of the layer of material A.

The invention claimed is:

1. A combined setting welding device designed to set stud-like welding auxiliary joining parts in at least one first layer of material and to subject them to a mechanical thermoforming process on a second layer of material made of electrically conductive material or on an electrically conductive area of a second layer of material and to connect them in a surface-connected manner through a welding operation in the contact area, wherein the setting welding device has the following characteristics:
   a driven punch, which is movable with a setting force of at least 5 kN, preferably at least 8 kN, against an oppositely arranged counter support, while
   the punch and the counter support are designed electrically conductively and connectable with an electric current source so that the punch and the counter support each form a welding electrode,
   an electronic control system of the setting welding device with a combined control and/or regulation device so that combined mechanical and electrical loads can be generated via the punch and the counter support on the welding auxiliary joining part, which ensure a mechanically and thermally supported penetration of the at least one first layer of material and a planar welding with the second layer of material.

2. The setting welding device according to claim 1, in which the punch is movable via an electrical, hydraulic or pneumatic drive and at least one force sensor is provided, which records a force of the punch on the welding auxiliary joining part and/or forwards it by means of an electrical reference signal to a recording apparatus for mechanical and electrical process data of the electronic control system.

3. The setting welding device according to claim 1, the electronic control system of which comprises a welding apparatus, with which a controllable or regulatable welding current can be generated between punch and counter support.

4. The setting welding device according to claim 1, the electronic control system of which comprises a heating apparatus, with which an adjustable heating of the welding auxiliary joining part and at least one subarea of at least one layer of material can be generated between punch and counter support.

5. The setting welding device according to claim 4, the recording apparatus of which comprises a plurality of measuring apparatuses, with which electrical and mechanical process data of the setting welding device, preferably current, voltage, force, punch path, temperature, can be recorded and transmitted to the recording apparatus.

6. The setting welding device according to claim 1, which comprises an evaluation apparatus, with which the recorded mechanical and electrical process data can be evaluated, compared with reference curves and/or characteristic value tables and with which correction values can be determined.

7. The setting welding device according to claim 6, the control/regulation apparatus of which has adjustable control curves for the mechanical and electrical process data on the punch and/or the counter support which can be regulated depending on the recorded mechanical and electrical process data from the recording apparatus.

8. The setting welding device according to claim 6, the control/regulation apparatus of which has an adaptive force regulation of the punch so that the force supplied to the punch is recorded with the aid of a force sensor and can be comparatively evaluated with a characteristic value so that a correction force can be readjusted based on the comparative evaluation.

9. The setting welding device according to claim 1, which also has a feed apparatus for welding auxiliary joining parts, with which welding auxiliary joining parts can be fed individually to a joining position below the punch.

10. The setting welding device according to claim 9, the feed apparatus of which comprises a hold down device, which can be attached to the first layer of material in a flexible manner or driven with a controllable force.

11. The setting welding device according to claim 10, the feed apparatus, welding apparatus and/or heating apparatus of which and control/regulation apparatus of which is provided modularly so that they can be combined with the setting welding device or with welding tongs or a setting device.

12. A continuous connecting method in the form of a mechanical-thermal setting welding process with the aid of a stud-like welding auxiliary joining part for at least one first layer of material without prepunching the at least one first layer of material \with at least one second layer of material made of weldable material or with a section made of weldable material, which has the following steps:
   a. driving of the welding auxiliary joining part into the at least one first layer of material with a combined mechanical-thermal load of at least the welding auxiliary joining part,
   b. deforming of the welding auxiliary joining part under combined mechanical-thermal load on the at least one second layer of material and
   c. planar welding of the welding auxiliary joining part with the at least one second layer of material so that the at least one first layer of material and the at least one second layer of material are interconnected via the welding auxiliary joining part, wherein
   d. during the driving in, deforming and welding of the welding auxiliary joining part the force applied to the welding auxiliary joining part by the punch and the electric current directed through the welding auxiliary joining part via the punch are specified with the aid of adjustable superimposed force and current characteristics lines depending on the time in order to continuously control the connecting method, wherein
   e. the force applied by the punch is reduced during the driving in of the welding auxiliary joining part, wherein a heat generated in the welding auxiliary joining part by electric current simultaneously supports the driving in of the welding auxiliary joining part.

13. The connecting method according to claim 12, wherein the force characteristic line and the current characteristic line are coordinated with respect to each other in order to achieve an adjustment of optimized parameters for the "driving in" and "deforming" phases with respect to material properties of the welding auxiliary joining part and of the at least one first layer of material and in order to avoid an energy overload of the material of the welding auxiliary joining part and/or of the material of the layers of material.

14. The connecting method according to claim 12, wherein the force of the electrode punch is reduced during the deforming and the current flowing in the welding auxiliary joining part is increased so that, under the mechanical base load, a shape adjustment takes place between the welding auxiliary joining part and the at least one first layer of material.

15. The connecting method according to claim 12, with the further step:
   recording of mechanical and electrical process data, in particular force, punch path, electrical voltage, electric current,
   comparison of the recorded process data with specified reference curves and/or characteristic value tables and
   determination of the control values for mechanical and electrical loads applied to the welding auxiliary joining part based on the evaluating comparison between the recorded process data and the reference curves and/or characteristic value tables.

16. The connecting method according to claim 12 with the step:
   targeted reshaping of at least one tip and/or shaft area of the welding auxiliary joining part during the driving in and deforming of the welding auxiliary joining part so that the welding auxiliary joining part is prepared for formation of a planar welding zone for the subsequent welding with the at least one second layer of material.

17. The connecting method according to claim 16, wherein, during the reshaping, a planar area sufficiently large for a welding process is generated between the at least one second layer of material and the reshaped tip area of the welding auxiliary joining part, in which the welding zone is formed during the welding.

18. A preparation method for welding between a welding auxiliary joining part and a layer of material made of weldable material or a layer of material with a section of weldable material, which has the following steps:
   targeted reshaping of at least one tip and/or shaft area of the welding auxiliary joining part during a driving in in a material layer of electrically conductive material and deforming of the welding auxiliary joining part by means of a punch setting device so that the welding auxiliary joining part is prepared for the subsequent welding with the at least one second layer of material, wherein an electric current is generated via the punch and a counter support in the welding auxiliary joining part and in the material layer to support the setting process.

19. The preparation method according to claim 18, wherein, during the reshaping, a boundary surface area sufficiently large for the welding is generated between the at least one second layer of material and the reshaped tip area of the welding auxiliary joining part.

20. The setting welding device according to claim 2, the electronic control system of which comprises a welding apparatus, with which a controllable or regulatable welding current can be generated between punch and counter support.

21. The setting welding device according to claim 2, the electronic control system of which comprises a heating apparatus, with which an adjustable heating of the welding auxiliary joining part and at least one subarea of at least one layer of material can be generated between punch and counter support.

22. The setting welding device according to claim 3, the recording apparatus of which comprises a plurality of measuring apparatuses, with which electrical and mechanical process data of the setting welding device, preferably current, voltage, force, punch path, temperature, can be recorded and transmitted to the recording apparatus.

23. The setting device according to claim 1, the control/regulation apparatus of which has adjustable control curves for the mechanical and electrical process data on the punch and/or the counter support which can be regulated depending on the recorded mechanical and electrical process data from the recording apparatus.

24. The setting welding device according to claim 9, the feed apparatus, welding apparatus and/or heating apparatus of which and control/regulation apparatus of which is provided modularly so that they can be combined with the setting welding device or with welding tongs or a setting device.

25. The connecting method according to claim 13 with the step:
targeted reshaping of at least one tip and/or shaft area of the welding auxiliary joining part during the driving in and deforming of the welding auxiliary joining part so that the welding auxiliary joining part is prepared for formation of a planar welding zone for the subsequent welding with the at least one second layer of material.

26. The connecting method according to claim 25, wherein, during the reshaping, a planar area sufficiently large for a welding process is generated between the at least one second layer of material and the reshaped tip area of the welding auxiliary joining part, in which the welding zone is formed during the welding.

* * * * *